(12) United States Patent
Rosado et al.

(10) Patent No.: US 9,178,437 B2
(45) Date of Patent: Nov. 3, 2015

(54) APPARATUS AND METHOD FOR AVOIDING TRANSFORMER SATURATION

(71) Applicant: General Electric Company, Schenectady, NY (US)

(72) Inventors: Sebastian Pedro Rosado, Munich (DE); Henry Todd Young, Erie, PA (US); Simon Herbert Schramm, Munich (DE); Alvaro Jorge Mari Curbelo, Munich (DE); Jason Daniel Kuttenkuler, Erie, PA (US)

(73) Assignee: General Electric Company, Schenectady, NY (US)

( * ) Notice: Subject to any disclaimer, the term of this patent is extended or adjusted under 35 U.S.C. 154(b) by 171 days.

(21) Appl. No.: 13/731,143

(22) Filed: Dec. 31, 2012

(65) Prior Publication Data

US 2014/0185328 A1    Jul. 3, 2014

(51) Int. Cl.
*H02M 3/335* (2006.01)
*H02M 1/40* (2007.01)

(52) U.S. Cl.
CPC ............ *H02M 3/33576* (2013.01); *H02M 1/40* (2013.01); *H02M 3/33507* (2013.01); *H02M 3/33584* (2013.01)

(58) Field of Classification Search
USPC ............ 363/21.04, 21.05, 21.09, 21.1, 21.11, 363/21.12, 21.13, 21.17, 21.18, 24, 25, 26
See application file for complete search history.

(56) References Cited

U.S. PATENT DOCUMENTS

| | | | | |
|---|---|---|---|---|
| 4,127,894 A | * | 11/1978 | Bishop et al. | 363/56.06 |
| 4,739,462 A | * | 4/1988 | Farnsworth et al. | 363/21.16 |
| 5,150,270 A | * | 9/1992 | Ernst et al. | 361/64 |
| 2004/0071004 A1 | * | 4/2004 | King | 363/142 |
| 2005/0268063 A1 | * | 12/2005 | Diao et al. | 711/170 |
| 2010/0165679 A1 | * | 7/2010 | Lu et al. | 363/89 |
| 2010/0246225 A1 | * | 9/2010 | Moon et al. | 363/124 |
| 2011/0299304 A1 | * | 12/2011 | Coley et al. | 363/21.09 |
| 2012/0081927 A1 | * | 4/2012 | Matsumoto | 363/21.05 |

OTHER PUBLICATIONS

R. Patel, "Detecting Impending Core Saturation in Switched-Mode Power Converters," Mar. 1980, in Proc. of the 7th National Solid-State Power Conversion Conference (POWERCON), vol. B3, pp. 1-11.*

R. Patel, "Detecting Impending Core Saturation in Switched-Mode Power Converters," in Proc. of the 7th National Solid-State Power Conversion Conference (POWERCON), vol. B3, pp. 1-11.

(Continued)

*Primary Examiner* — Jeffrey Gblende
(74) *Attorney, Agent, or Firm* — GE Global Patent Operations; John A. Kramer

(57) ABSTRACT

A controller for a power converter includes one or more controller modules operably linked to a transformer core of the power converter, to primary bridge switches of the power converter, and to secondary bridge switches of the power converter, wherein the one or more controller modules are configured to avoid saturation of the transformer core by modulating pulse widths of first electrical pulses sent to the primary bridge switches, based at least on measurements of DC components of current through primary and secondary windings adjacent the transformer core, and by modulating pulse widths of second electrical pulses sent to the secondary bridge switches, based at least on measurements of DC components of current through the primary and secondary windings.

14 Claims, 6 Drawing Sheets

(56) References Cited

OTHER PUBLICATIONS

S. Klopper and J. A. Ferreira, "A Sensor for Balancing Flux in Converters with a High-Frequency Transformer Link," IEEE Transactions on Industry Applications, vol. 33, pp. 774-779, May/Jun. 1997.

G. Ortiz, J. Muhlethaler, J.W. Kolar, ?Magnetic Ear-based balancing of magnetic flux in high power medium frequency dual active bridge converter transformer cores, 2011 IEEE 8th Intl. Conf. on Power Electronics and ECCE, pp. 1307-1314, May-Jun. 2011.

F. Stögerer, J. W. Kolar, and U. Drofenik, "A Novel Concept for Transformer Volt Second Balancing of VIENNA Rectifier III Based on Direct Magnetizing Current Measurement," in Proc. of the Nordic Workshop on Power and Industrial Electronics Workshop, Jun. 2000, pp. 134-139.

D. Wilson, "A New Pulsewidth Modulation Method Inherently Maintains Output Transformer Flux Balance," in Proc. 8th POWERCON, vol. D1, pp. 1-14, Apr. 1981.

W. M. Polivka, A. Cocconi, and S. Cuk, "Detection of Magnetic Saturation in Switching Converters," in Proc. of the PCI Conference, Mar. 1982, pp. 584-597.

G. Buticchi, E. Lorenzani, "A Sensor to Detect the DC Bias of Distribution Power Transformers", 2011 IEEE Intl. Symp. SDEMPED, pp. 63-70.

T. Nakajima, et.al., "A New Control Method Preventing Transformer DC Magnetization for Voltage Source Self-Commutated Converters", IEEE Transactions on Power Delivery, vol. 11, No. 3, Jul. 1996.

S. Han, I. Munuswamy, D. Divan, "Preventing Transformer Saturation in Bi-Directional Dual Active Bridge Buck-Boost DC/DC Converters," 2010 IEEE ECCE, pp. 1450-1457.

\* cited by examiner

APPARATUS AND METHOD FOR AVOIDING TRANSFORMER SATURATION

BACKGROUND

1. Technical Field

Embodiments of the invention relate generally to transformers used in power converters. Other embodiments relate to control circuits for such transformers.

2. Discussion of Art

The term "power converter" is most commonly applied to collections or an assembly of electrical devices that convert one form of electrical energy to another. Typically, power converters are "switching" power converters, in which multiple solid state devices are used to intermittently interrupt an input current so as to effectuate conversion of the input current to an output current having different amplitude, voltage, and/or frequency. For example, an "AC power converter" receives direct or alternating input current and produces alternating output power at design values of voltage, current, and/or frequency. By contrast, a "DC power converter" produces output power at a substantially constant output voltage and/or current.

Certain types of power converter comprise transformers. A transformer is an electromagnetic device that includes at least two "windings" or inductors, which are disposed sufficiently close together such that varying current in either of the windings can establish a varying magnetic field that excites a current in the other winding. Thus, the windings of a transformer are mutually inductive. Typically, a transformer will include a "core" of ferromagnetic material, which enhances the mutual inductance of the windings because each winding tends to magnetize the core. The mutual inductance of the windings enables power transfer from one "primary" winding to the other "secondary" winding, without direct electrical connection, via variation of the magnetic field excited in the core.

The electrical isolation provided by a transformer is a key reason why the transformer is useful in a power converter. However, it is possible for excess direct current in either winding to "saturate" the core, which means that further variation of current in that winding, above its excess value, does not effect any change in magnetization of the core. In this context, "direct current" refers to a current component of substantially constant polarity and magnitude, while "substantially" is a relative term indicating as close to a notional value as can be achieved under conventional tolerances of manufacturing and operation. When a transformer core is saturated, mutual inductance between the windings is prevented. This can result in failure of power transfer through the core. When the transformer is in use within a power converter, such failure of power transfer can have detrimental consequences for the power converter, its power supply, and its attached load. For example, when power ceases to be transferred, the load seen at the power supply drops off, which can result in an overcurrent condition at the primary side of the power converter. This condition in turn can result in a safety circuit tripping the power converter offline, or, in a worst case, physical damage to the power converter and/or its power supply.

BRIEF DESCRIPTION

In view of the above, it is desirable to provide for mitigation of transformer core saturation, in a way that does not require additional components nor detract from efficient operation. Accordingly, in embodiments, a controller for a power converter (e.g., a controller for a dual active bridge power converter) comprises one or more controller modules operably linked to a transformer core of the power converter, to primary bridge switches of the power converter, and to secondary bridge switches of the power converter. (Individually, the controller modules may comprise electronic components or other hardware elements, and/or sets of instructions or other software according to which the hardware elements operate; however, in total, the controller includes at least some hardware elements, e.g., a processor, configured for power converter control. The controller may perform, or be part of a system that performs, multiple functions only one of which is power converter control.) The one or more controller modules are configured to avoid saturation of the transformer core by modulating pulse widths of first electrical pulses sent to the primary bridge switches and of second electrical pulses sent to the secondary bridge switches. The controller is configured to modulate the pulse widths of the first electrical pulses (sent to the primary switches) and of the second electrical pulses (sent to the secondary switches), based at least on measurements of current through primary and secondary windings adjacent the transformer core.

In embodiments, the controller is configured to modulate the pulse widths according to a multi-input, multi-output (MIMO) algorithm (e.g., stored as program instructions on a non-transitory medium accessible by and/or part of the controller), which accepts the measurements of DC components of current as inputs and produces as outputs signals for modulating the pulse widths.

In another embodiment, a power converter for connection between a primary link and a secondary link comprises a transformer having a core, a primary winding, and a secondary winding electromagnetically coupled to the primary winding via the core. The power converter further comprises a primary bridge network comprising a first plurality of switches for electrically connecting the primary winding to the primary link, and a secondary bridge network comprising a second plurality of switches for electrically connecting the secondary winding to the secondary link. The power converter further comprises a controller electrically connected for sending electrical pulses to control the first and second pluralities of switches, configured to accept as inputs measurements of DC current components in the primary and secondary windings, and configured to produce adjustments (e.g., differential adjustments, which may be null adjustments) to pulse widths of the electrical pulses based on the measurements of the DC current components, to prevent saturation of the core.

In aspects, a method is provided, e.g., a method for preventing saturation of a transformer core of a power converter. The method comprises measuring DC components of current at primary and secondary windings of the transformer core, adjusting pulse widths of primary bridge switches (e.g., pulse widths of first electrical pulses sent to the primary bridge switches for controlling power conversion), based on the measured DC components of current, and adjusting pulse widths of secondary bridge switches (e.g., pulse widths of second electrical pulses sent to the secondary bridge switches for controlling the power conversion), based on the measured DC components of current.

In other aspects, a method is provided, which comprises applying first electrical pulses to a first plurality of switches of a power converter. In addition to the first plurality of switches, the power converter comprises a transformer having a core; a primary winding; and a secondary winding electromagnetically coupled to the primary winding via the core; as well as a second plurality of switches for electrically connecting the secondary winding to the secondary link. The first plurality of switches electrically connects the primary winding of the transformer to a primary link, so that the power converter is connected between the primary and secondary links. The method further comprises applying second electrical pulses to the second plurality of switches. The first electrical pulses and the second electrical pulses are configured for converting power between the primary link and the secondary link. The method further comprises measuring DC components of current through the primary and secondary windings, and preventing saturation of the core by adjusting respective pulse widths of the first electrical pulses and the second electrical pulses, based on the measured DC components of current.

DRAWINGS

The present invention will be better understood from reading the following description of non-limiting embodiments, with reference to the attached drawings, wherein below:

DETAILED DESCRIPTION

Figure 1:
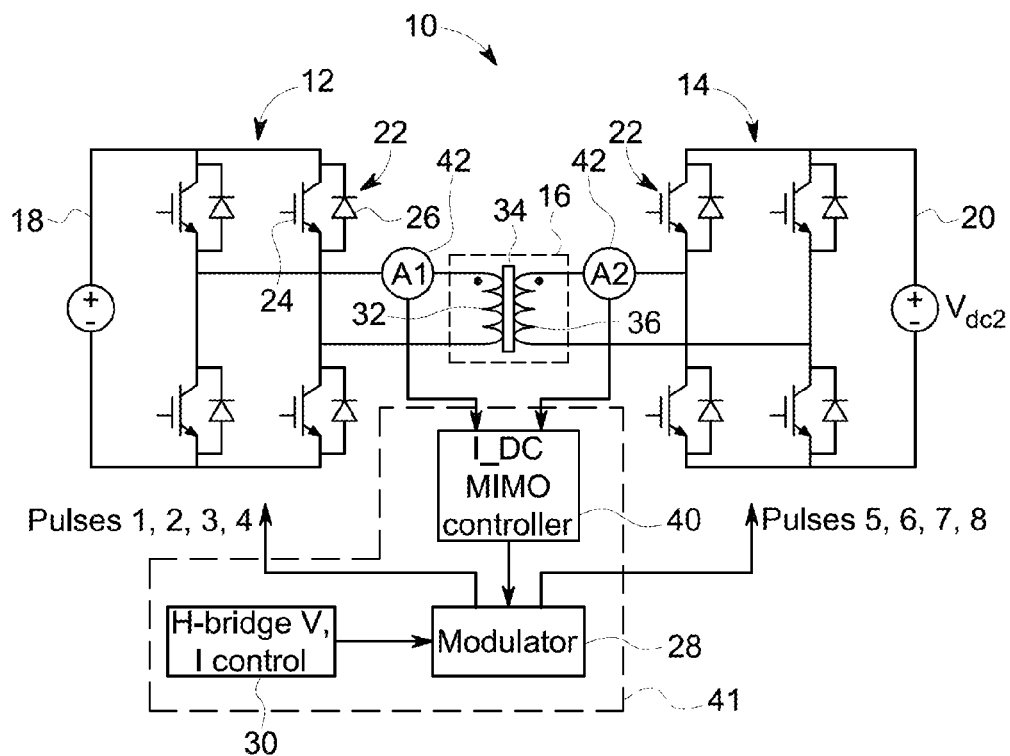
FIG. 1 illustrates a power converter de-saturation apparatus according to an embodiment of the present invention.

Reference will be made below in detail to exemplary embodiments of the invention, examples of which are illustrated in the accompanying drawings. Wherever possible, the same reference characters used throughout the drawings refer to the same or like parts, without duplicative description. Although exemplary embodiments of the present invention are described with respect to a dual active bridge power converter, aspects of the invention also are applicable for use with switched power converters, generally.

Aspects of the invention relate to preventing saturation of a transformer core, within a switched power converter, by modulating pulse widths of the power converter switches, so as to achieve substantially zero direct current in the transformer windings. As used herein, the terms "substantially," "generally," and "about" indicate conditions within reasonably achievable manufacturing and assembly tolerances, relative to ideal desired conditions suitable for achieving the functional purpose of a component or assembly.

In an exemplary embodiment, as shown in FIG. 1, a dual active bridge power converter 10 includes a primary bridge network 12 and a secondary bridge network 14 that are electrically isolated and electromagnetically coupled by a transformer 16, whereby power can be transferred from one to the other via the transformer. Under normal operation, the primary bridge network 12 receives DC current from a primary link 18, which is the nominal power source of the power converter 10. The secondary bridge network 14 delivers current and voltage waveforms to a secondary link 20, which is the nominal load of the power converter 10. Each bridge network 12, 14 includes several switch modules 22, which are shown as including solid state transistors 24 arranged anti-parallel with shunt diodes 26; however, equivalent circuit components will be apparent to those of skill and may be substituted without impairing the principles of the present invention. (By "anti-parallel" it is meant that each shunt diode 26 is connected with a corresponding transistor 24, anode-to-emitter and cathode-to-collector, such that the shunt diodes carry current that otherwise would reverse-bias the transistors.)

It should be noted that the power converter 10 is described as "dual active bridge" because each switch module 22 is energized (transistor conducting) or de-energized (transistor not conducting) by pulses sent from a modulator 28, such that by varying operation of the modulator, power may be transferred in either direction between the primary and secondary links 18, 20. Thus, in FIG. 1, the modulator 28 sends first electrical pulses 1, 2, 3, 4 to the switch modules 22 of the primary bridge network 12, and sends second electrical pulses 5, 6, 7, 8 to the switch modules 22 of the secondary bridge network 14. Indeed, an H-bridge current/voltage control module 30 is provided for adjusting the modulator 28 to transfer current and voltage in either direction between the secondary link 20 and the primary link 18.

In particular, the control module 30 sends a control signal p to the modulator 28 for varying the timing for energization and de-energization (pulse widths) of each of the switch modules 22 in the primary bridge network 16. By default, each pulse width duration is approximately 50% (one half) of the switching cycle if no control on the DC value is applied. The control signal p configures the modulator 28 to vary the primary switch modules pulse widths so as to periodically commutate the primary link 18 voltage over the primary winding 32 of the transformer 16. (By "commutate" is meant to energize or de-energize an electrical circuit and/or reverse polarities across the circuit.) Commutating the primary link 18 in this fashion produces fluctuating current in the primary winding 32, and this fluctuating current in turn induces a varying magnetic field in a core 34 of the transformer 16. The varying magnetic field excites varying current and voltage in a secondary winding 36 of the transformer 16.

Additionally, the control module 30 sends a control signal s to the modulator 28 for varying the pulse widths of each switch module 22 of the secondary bridge network 14, so as to commutate the secondary link 20 and the secondary winding 36. This secondary side commutation controls how much current flows from the secondary winding 36 to the secondary link 20, and at what voltage, such that the control module 30 can regulate total power transfer between the primary link 18 and the secondary link 20.

In addition to the control module 30, embodiments of the invention include a de-saturation apparatus 40, as shown in FIG. 1, whereby the control signals p and s are adjusted to mitigate DC currents in the primary or secondary windings 32, 36. The inventive apparatus 40 is configured to receive sporadic or continuous electrical measurements x(t), y(t) from winding instruments 42 that are connected at the primary and secondary transformer windings 32, 36. (By "sporadic" is meant, at constant or varying periodicity sufficiently long such that interpolation is required to permit timely adjustment of the control signals p, s for de-saturating the transformer core 34. By "continuous" is meant, at sufficiently short periodicity so as to permit real-time adjustment of the control signals without interpolation.)

Based on the received electrical measurements, the de-saturation apparatus 40 is configured to produce differential adjustments dp, ds according to a MIMO (multi-input, multi-output) control algorithm as further discussed below. The de-saturation apparatus 40 then sends the differential adjustments dp, ds to the modulator 28, which combines the differential adjustments with the original control signals p, s. The modulator 28 is configured to receive the control signals p, s and the adjustments dp, ds and to, in response to these signals, adjust the pulse widths of the first and second electrical pulses that are sent to the switch modules 22 of the primary and secondary bridge networks 12, 14. By adjusting the pulse widths, the modulator 28 not only adjusts the output voltage and current, but also can also apply a unipolar voltage on the transformer windings and modify the level of saturation within the transformer core 34.

The modulator 28, the control module 30, and the de-saturation apparatus 40 may collectively be referred to as a "controller" 41, or may separately be described as "controller modules." Collectively, the controller 41 modulates pulse widths of the first and second electrical pulses sent to the switch modules 22 of the primary and secondary bridge networks 12, 14. Individually, the de-saturation apparatus 40 produces differential adjustments dp, ds to control signals p, s within the controller 41. Based on the differential adjustments dp, ds, the modulator 28 then adjusts the pulse widths of the first and second electrical pulses in order to avoid saturation of the transformer core 34. These distinct but related functions can be accomplished in various ways that will be apparent to the skilled worker. For example, multiple functions herein described as being accomplished by distinct controller modules, may be combined within a single module. As another example, a single function described as being accomplished by a particular controller module, may be distributed across several modules.

Figure 2:
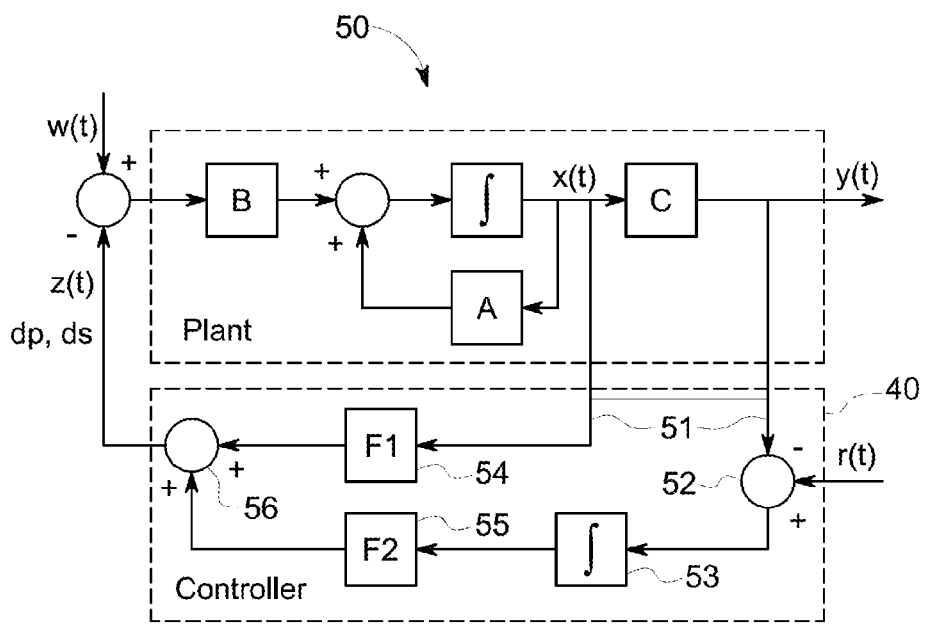
FIG. 2 illustrates an algorithm for configuring an apparatus according to an embodiment of the present invention.

FIG. 2 illustrates in schematic form an exemplary MIMO (multi-input, multi-output) control algorithm 50 for de-saturating the transformer core 34. The exemplary control algorithm 50 assesses in real time the amplitude and rate of change of the DC components of current in the primary and secondary windings 32, 36. Based on this assessment, the control algorithm 50 generates sporadic (stepwise) or continuous target time functions of primary and secondary winding voltage levels V1dct, V2dct. Based on the target time functions, the apparatus 40 produces the differential adjustments dp, ds. The differential adjustments dp, ds are set for configuring the modulator 28 to establish pulse widths that approximate the target time functions of voltage, whereby the DC components of current in the windings are held near a reference value r(t)=0. With the DC components of current held near r(t)=0, saturation of the transformer core 34 is avoided. In this context "near" means, sufficiently close to meet relevant operational constraints. For example, transformer core saturation is known to produce spikes of primary winding current and/or voltage. An exemplary operational constraint is that, with the DC components of current held near r(t)=0, such spikes do not exceed 30% of current and/or voltage values corresponding to the unsaturated case. In other words, if any core saturation occurs, it is sufficiently slight as to meet the operational constraint. In certain embodiments, the DC components of current are held sufficiently near r(t)=0 as not to reach the threshold saturation current of the transformer core 34. In some instances, either or both of the differential adjustments dp, ds may be null adjustments, i.e., may not alter the pulse widths set by the control module 30.

At step 51, the control algorithm 50 receives from the winding instruments 42 some electrical measurement vectors that are represented by x(t), y(t). Each electrical measurement vector includes an array of one or more system parameters. For example, x(t) can include I1dc (primary winding DC component of current) as well as I2dc (secondary winding DC component of current); x(t) and y(t) also could share one or more signals. At step 52, the algorithm 50 takes a difference of the electrical measurements y(t) from a target function r(t); at step 53, the algorithm 50 integrates the difference r(t)−y(t). Typically, the target function r(t)=0, as it is desired to minimize DC components of current in the primary and secondary windings. At steps 54 and 55, the algorithm 50 applies control transforms F1, F2 respectively to x(t) and to the integrated differential. The control transforms are vector transforms that take array inputs and produce array outputs. For example, each control transform may output partial values of the differential adjustments dp, ds. At step 56, the algorithm 50 sums the outputs of the control transforms F1+F2 to produce the differential adjustments dp, ds.

Measurements of various electrical parameters can be provided as inputs to the control algorithm 50. Accordingly, the control functions F1, F2 may be adjusted corresponding to the different electrical measurements that can be used. For example, any of linear quadratic regulator (LQR) approach, or H-2, or H-infinity type of mathematic formulations can be used for the control functions F1, F2.

Figure 3:
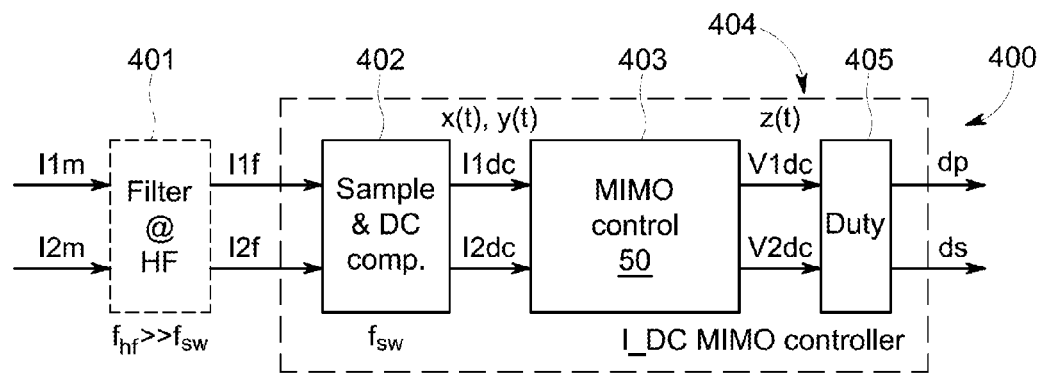
FIG. 3 illustrates a first mode of operation of an apparatus according to an embodiment of the present invention.
Figure 4:
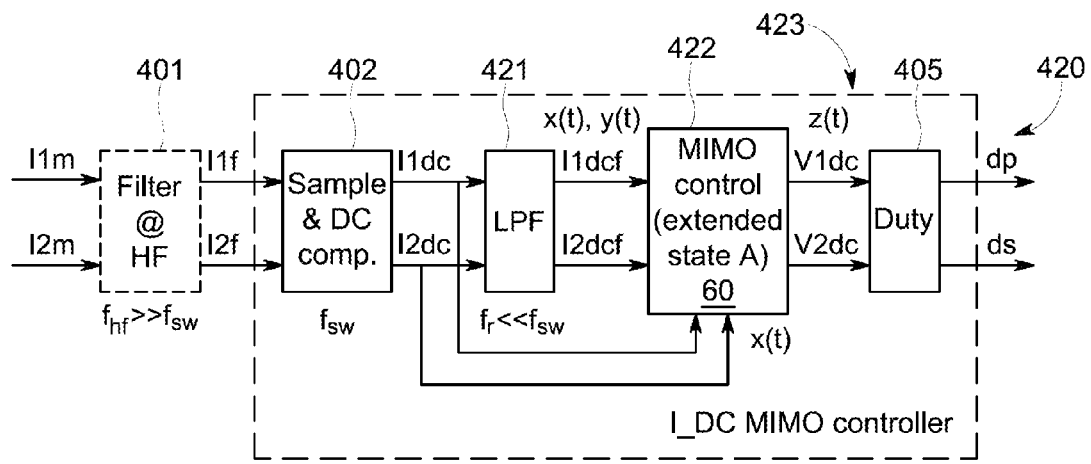
FIG. 4 illustrates a second mode of operation of an apparatus according to an embodiment of the present invention.
Figure 5:
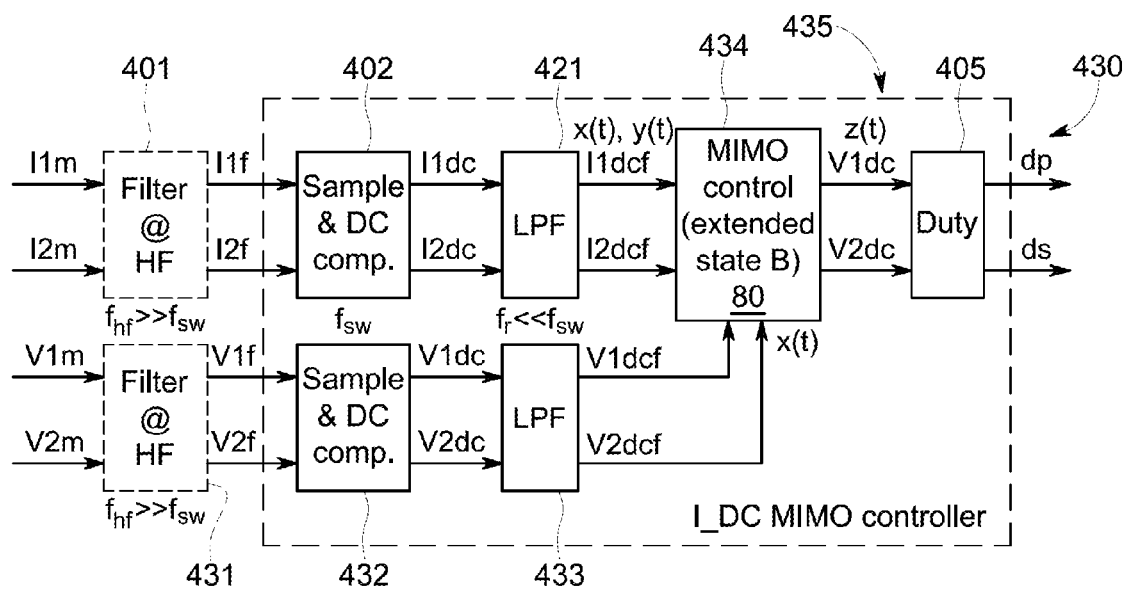
FIG. 5 illustrates a third mode of operation of an apparatus according to an embodiment of the present invention.

FIGS. 3-5 illustrate modes of implementing the de-saturation apparatus 40, using various electrical measurements within the MIMO algorithm 50 shown in FIG. 2. For example, FIG. 3 illustrates a first mode of operation 400 of the apparatus 40, in which at step 401 current measurements I1m, I2m are filtered to eliminate components above a frequency fhf that is much higher than the switching frequency fsw of the modulator 28 (e.g., more than about 5 times the switching frequency fsw). Then at step 402, the filtered current measurements I1f, I2f are sampled and compared to a threshold DC value to produce DC current component measurements I1dc, I2dc. At step 403, the apparatus 40 implements the control algorithm 50 using as inputs x(t)={I1dc, I2dc}, y(t)={I1dc, I2dc}. At step 404, primary and secondary DC target voltages V1dct, V2dct are output from the algorithm 50 to a duty cycle algorithm 405, which sends to the modulator 28 the differential adjustments dp, ds for modulating the switches 22 in each bridge network 12 or 14 to achieve the target voltages V1dct, V2dct.

FIG. 4 shows a second mode of implementation 420, which includes step 421 of low pass filtering the differential filtered current measurements I1dc, I2dc to produce band pass filtered current measurements I1dcf, I2dcf. At step 422, the apparatus 40 implements a first extended state MIMO algorithm 60. The first extended state MIMO algorithm 60 accepts inputs x(t)={I1dc, I2dc, I1dcf, I2dcf}, y(t)={I1dcf, I2dcf}. Accordingly, the first extended state MIMO algorithm 60 uses different control transforms from the base control algorithm 50. Selection of the control transforms is apparent based on the chosen inputs, and is not further discussed. At step 423, the first extended state MIMO algorithm 60 passes primary and secondary DC target voltages V1dct, V2dct to the duty cycle algorithm 405. As in FIG. 3, the duty cycle algorithm then sends the differential adjustments dp, ds to the modulator 28, which accordingly energizes the switches 22 in each bridge network 12 or 14 for achieving the target voltages V1dct, V2dct.

FIG. 5 shows a third mode of implementation 430, in which the apparatus 40 receives measurements V1m and V2m of primary and secondary winding DC voltages, as well as measurements I1m and I2m of primary and secondary winding DC current components. At step 431, the voltage measurements V1m and V2m are filtered to eliminate components at frequencies in excess of the high threshold frequency fhf. At step 432, the filtered voltage measurements V1f, V2f are sampled at the switching frequency fsw to produce DC voltage functions V1*dc*, V2*dc*. At step 433, the DC voltage functions are low pass filtered to produce filtered DC voltage functions V1*dcf*, V2*dcf*. At step 434, the apparatus 40 then implements a second extended state MIMO algorithm 80 using inputs x(t)={I1*dcf*, I2*dcf*, V1*dcf*, V2*dcf*}, y(t)={V1*dcf*, V2*dcf*}. Again, the control transforms F1, F2 are selected based on the inputs in a manner apparent to the skilled worker. At step 435, the second extended state MIMO algorithm 80 outputs primary and secondary DC target voltage levels V1*dct*, V2*dct* to the duty cycle algorithm 405. As in the other modes of operation, the duty cycle algorithm 405 then generates and sends to the modulator 28 the differential adjustments dp, ds.

While the terms "step" and "algorithm" have been used as if in reference to pure software implementations of the various modes of operation within a processor, each "step" or "algorithm" equally can be accomplished by operation of analog or digital circuitry modules or even by equivalent electromechanical components.

Figure 6A:
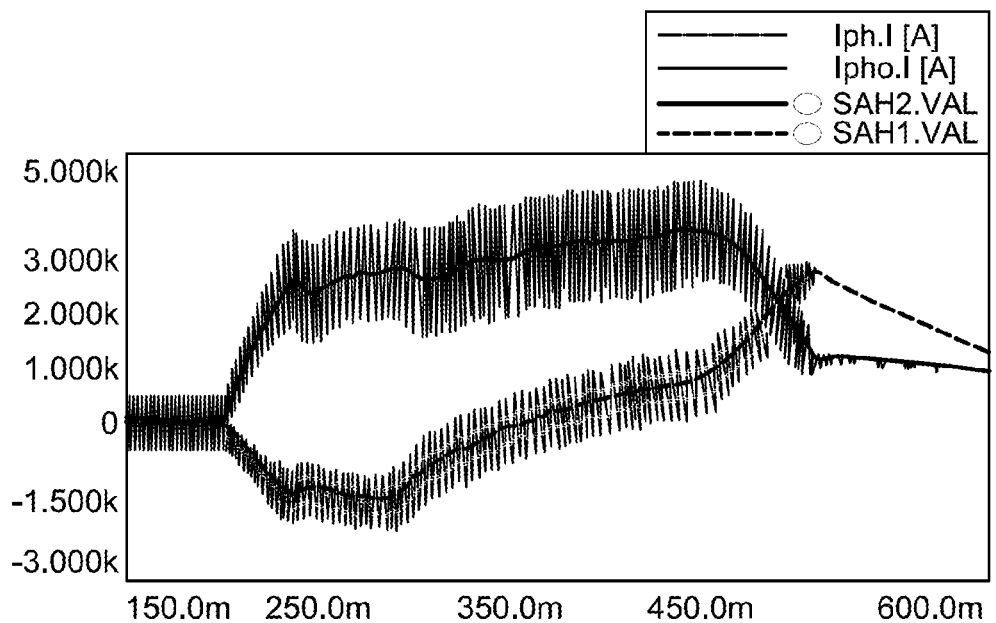
FIGS. 6A-6B illustrate simulations of a dual active bridge power converter, operating with and without an apparatus according to an embodiment of the present invention.
Figure 6B:
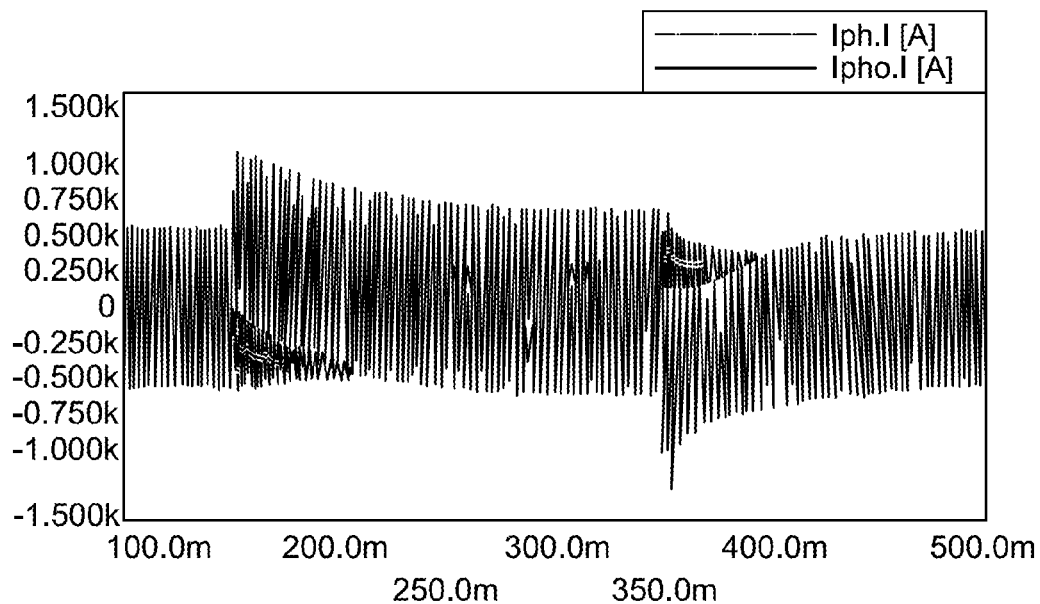

FIGS. 6A-6B illustrate a simulation comparing the dual active bridge converter 10, operating without (FIG. 6A) and with (FIG. 6B) a de-saturation apparatus 40 according to an embodiment of this invention. In each drawing figure, Iph.I represents the primary winding current and Ipho.I represents the secondary winding current. SAH1.VAL represents the average value over a switching period of Iph.I while SAH2.VAL represents the average value over a switching period of Ipho.I. The large transient currents (spikes) of FIG. 6A can be expected to trip protective circuits (not shown) of the power converter 10, thereby interrupting the system operation. In the absence of protective circuits, spikes as shown in FIG. 6A can eventually damage some of the power converter components (e.g., the primary or secondary windings; one or more of the switch modules). By contrast, FIG. 6B shows maximal current spikes not exceeding about one third of the uncontrolled transients shown in FIG. 6A.

Figure 7A:
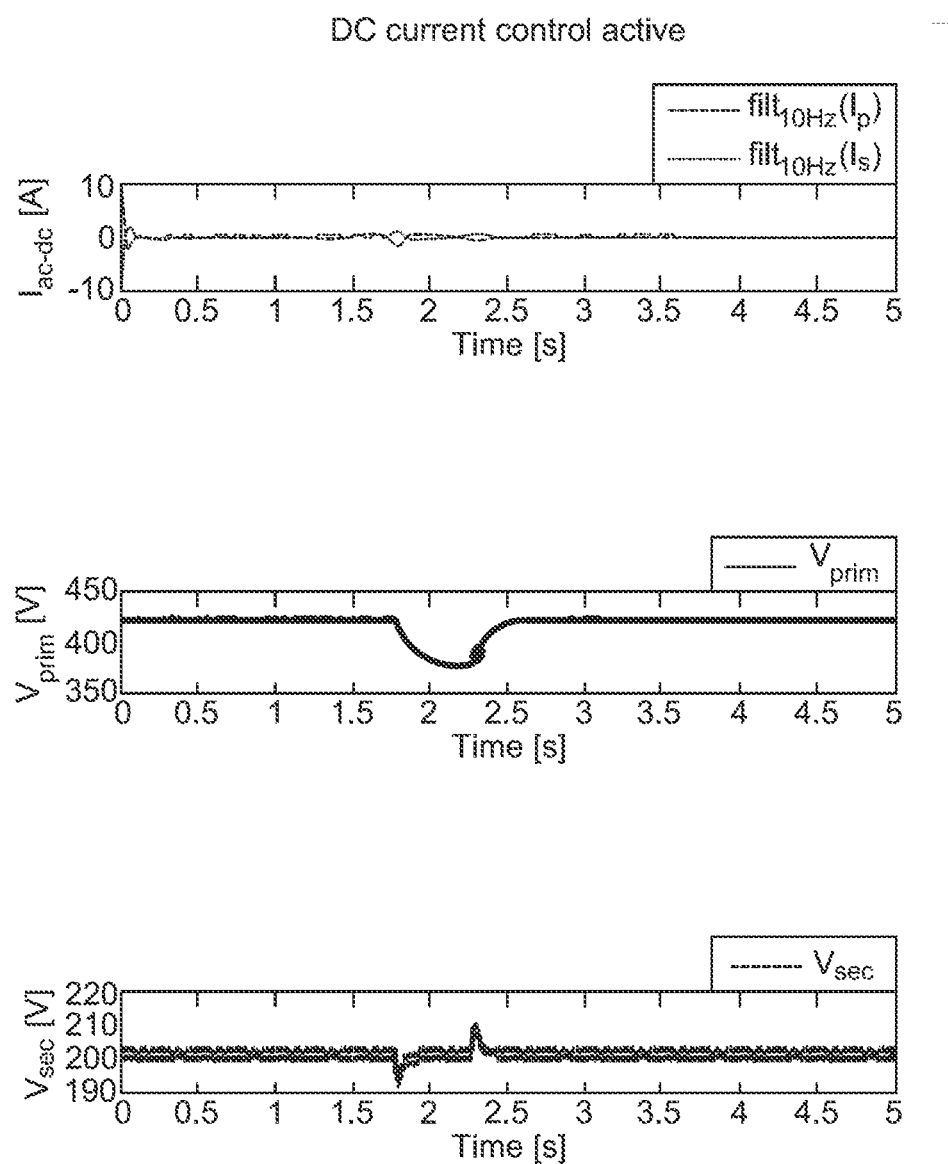
FIGS. 7A-7B illustrate results of a low power test of an apparatus and algorithm according to FIGS. 1-3.
Figure 7B:
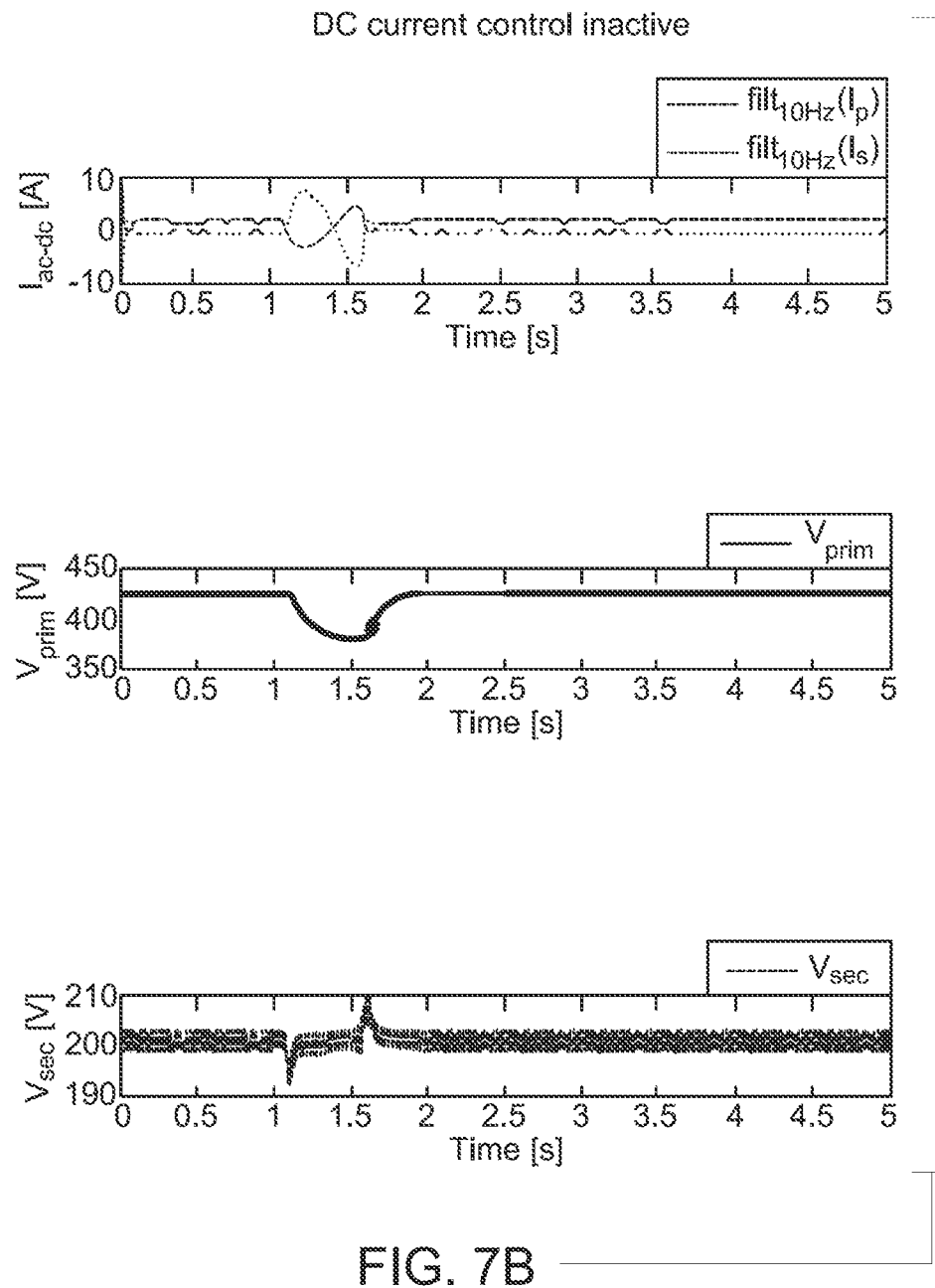

FIGS. 7A-7B shows results of an experimental test of the proposed DC current control/de-saturation apparatus 40, under the first mode of operation 400 as shown in FIG. 3. The experiment shows the evolution of the DC current components on the transformer windings under a transient perturbation on the primary DC link. FIG. 7A shows the case when the control apparatus proposed here is active while FIG. 7B shows the case when it is inactive. In each drawing figure, filt10Hz(Ip) and filt10Hz(Is) in the Iac-dc chart are the DC components of the primary and secondary winding currents; Vprim represents primary link DC voltage, and Vsec represents the secondary link DC voltage.

Thus, in embodiments, a controller is provided for a power converter, e.g., for a dual active bridge power converter. The controller comprises one or more controller modules operably linked to a transformer core of the power converter, to primary bridge switches of the power converter, and to secondary bridge switches of the power converter. The one or more controller modules are configured (individually or collectively) to avoid saturation of the transformer core by modulating pulse widths of first electrical pulses sent to the primary bridge switches, based at least on measurements of current through primary and secondary windings adjacent said transformer core, and by modulating pulse widths of second electrical pulses sent to the secondary bridge switches, based at least on said measurements of current through said primary and secondary windings. In certain embodiments, the one or more controller modules are configured to avoid the saturation of the transformer core by implementing a multi-input, multi-output (MIMO) algorithm for the modulating of the pulse widths of first electrical pulses sent to the primary bridge switches and of second electrical pulses sent to the secondary bridge switches. The MIMO algorithm modulates the pulse widths of the primary switches and of the secondary switches, based at least on the measurements of current through the primary and secondary windings adjacent the transformer core. In certain embodiments, the MIMO algorithm modulates pulse widths based also on measurements of voltage through the primary and secondary windings. In some embodiments, the MIMO algorithm incorporates low pass filtration of the voltage measurements. In some embodiments, the MIMO algorithm incorporates low pass filtration of the current measurements. In some embodiments, the one or more controller modules may comprise a modulator operably coupled to the primary bridge switches and to the secondary bridge switches, a control module operably coupled to the modulator, and a de-saturation apparatus operably coupled to the transformer windings and to the modulator. In such embodiments, the modulator is configured to send the first electrical pulses to the primary bridge switches and to send the second electrical pulses to the secondary bridge switches. The control module is configured to send one or more control signals to the modulator for controlling pulse widths of the first electrical pulses and of the second electrical pulses. The de-saturation apparatus is configured, according to the MIMO algorithm, to provide the modulator with differential adjustments for the pulse widths of the first electrical pulses sent to the primary bridge switches and for the pulse widths of the second electrical pulses sent to the secondary bridge switches.

In other embodiments, a power converter apparatus is provided, e.g., a power converter for connection between a primary link and a secondary link. The power converter apparatus includes a transformer, a primary bridge network, and a secondary bridge network. The transformer has a core, a primary winding, and a secondary winding electromagnetically coupled to the primary winding via the core. The primary bridge network includes a first plurality of switches for electrically connecting the primary winding to the primary link. The secondary bridge network includes a second plurality of switches for electrically connecting the secondary winding to the secondary link. The power converter apparatus also includes a controller electrically connected for sending electrical pulses to control the first and second pluralities of switches, configured to accept as inputs measurements of DC components of current in the primary and secondary windings, and configured to produce differential adjustments to pulse widths of some or all of the electrical pulses, based on the DC components of current, to avoid saturation of the core. In certain embodiments, the controller is configured according to a multi-input, multi-output (MIMO) algorithm for accepting the measurements of the DC components of current as the inputs and for producing the differential adjustments to prevent the saturation of the core. Additionally, the MIMO algorithm may also accept as inputs measurements of DC voltage through the primary and secondary windings, and the controller may be further configured to base the differential adjustments on the DC voltage. In some embodiments, the controller is configured to low pass filter selected inputs to the MIMO algorithm. For example, the controller may provide low-pass filtered measurements of current and/or voltage to the MIMO algorithm. In certain embodiments, the MIMO algorithm is configured as a linear quadratic regulator of the DC components of current in the primary winding and in the secondary winding.

In some aspects, a method is provided, e.g., a method for preventing saturation of a core of a transformer within a power converter. The inventive method includes measuring DC components of current at primary and secondary windings of the transformer, adjusting pulse widths of primary bridge switches of the power converter, based on the measured DC components of current, and adjusting pulse widths of secondary bridge switches of the power converter, based on the measured DC components of current. In some aspects, the pulse widths of the primary bridge switches and the pulse widths of the secondary bridge switches are adjusted according to a MIMO algorithm taking as inputs the DC components of current at the primary windings and at the secondary windings. In select aspects, the pulse widths of the primary bridge switches and the pulse widths of the secondary bridge switches are adjusted according to the MIMO algorithm also taking as inputs measurements of DC voltage through the primary and secondary windings. The method may also comprise low pass filtering of selected inputs to the MIMO algorithm. The MIMO algorithm may be configured as a linear quadratic regulator of the DC components of current in the primary winding and in the secondary winding.

In other aspects, a method is provided, which comprises applying first electrical pulses to a first plurality of switches of a power converter. In addition to the first plurality of switches, the power converter comprises a transformer having a core; a primary winding; and a secondary winding electromagnetically coupled to the primary winding via the core; as well as a second plurality of switches for electrically connecting the secondary winding to the secondary link. The first plurality of switches electrically connects the primary winding of the transformer to a primary link, so that the power converter is connected between the primary and secondary links. The method further comprises applying second electrical pulses to the second plurality of switches. The first electrical pulses and the second electrical pulses are configured for converting power between the primary link and the secondary link. The method further comprises measuring DC components of current through the primary and secondary windings, and preventing saturation of the core by adjusting respective pulse widths of the first electrical pulses and the second electrical pulses, based on the measured DC components of current. In certain aspects, the method further comprises measuring DC voltage at the primary and secondary windings, wherein the respective pulse widths of the first electrical pulses and the second electrical pulses are adjusted further based on the DC voltage. Optionally, the method also comprises low pass filtering the measured DC components of current. The method may include linear quadratic regulation of the DC components of current in the primary winding and in the secondary winding.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of the elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described apparatus and method, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:
1. A power converter comprising:
a transformer having a core, a primary winding, and a secondary winding electromagnetically coupled to the primary winding via the core;
a primary bridge network comprising a first plurality of switches for electrically connecting the primary winding to a primary link;
a secondary bridge network comprising a second plurality of switches for electrically connecting the secondary winding to a secondary link; and
a controller electrically connected for sending electrical pulses to control the first and second pluralities of switches, configured to accept as inputs measurements of DC components of current in the primary and secondary windings, and configured to produce differential adjustments to pulse widths of some or all of the electrical pulses, based on the DC components of current including based on an assessed rate of change of the DC components of current in the primary and secondary windings, to prevent saturation of the core;
wherein the controller is further configured to generate target time functions of voltage levels of the primary and secondary windings based on the assessed rate of change, and to produce the differential adjustments based on the target time functions, wherein the differential adjustments are set for the pulse widths to approximate the target time functions of the voltage levels, to hold the DC components of current in the primary and secondary windings at near a value of zero.

2. A power converter as claimed in claim 1, wherein the controller is configured according to a multi-input, multi-output (MIMO) algorithm for accepting the measurements of the DC components of current as the inputs and for producing the differential adjustments to prevent the saturation of the core.

3. A power converter as claimed in claim 2, wherein the controller is configured according to the MIMO algorithm to also accept as inputs measurements of DC voltage through the primary and secondary windings, and wherein the controller is further configured to base the differential adjustments on the DC voltage.

4. A power converter as claimed in claim 2, wherein the controller is configured to low pass filter selected inputs to the MIMO algorithm.

5. A power converter as claimed in claim 2, wherein the controller is configured according to the MIMO algorithm as a linear quadratic regulator of the DC components of current in the primary winding and in the secondary winding.

6. A method comprising:
measuring DC components of current at primary and secondary windings of a transformer of a power converter;
assessing a rate of change of the measured DC components of current in the primary and secondary windings;
adjusting pulse widths of primary bridge switches of the power converter, based on the measured DC components of current and the assessed rate of change;
adjusting pulse widths of secondary bridge switches of the power converter, based on the measured DC components of current and the assessed rate of change;
generating target time functions of voltage levels of the primary and secondary windings based on the assessed rate of change;
wherein the pulse widths of the primary bridge switches and the pulse widths of the secondary bridge switches are adjusted to prevent saturation of a core of the transformer;
wherein the adjustments are based on the target time functions; and
wherein the adjustments are set for the pulse widths to approximate the target time functions of the voltage levels, to hold the DC components of current in the primary and secondary windings at near a value of zero.

7. A method as claimed in claim 6, wherein the pulse widths of the primary bridge switches and the pulse widths of the secondary bridge switches are adjusted according to a MIMO algorithm taking as inputs the DC components of current at the primary windings and at the secondary windings.

8. A method as claimed in claim 7, wherein the pulse widths of the primary bridge switches and the pulse widths of the secondary bridge switches are adjusted according to the MIMO algorithm also taking as inputs measurements of DC voltage through the primary and secondary windings.

9. A method as claimed in claim 7, further comprising low pass filtering of selected inputs to the MIMO algorithm.

10. A method as claimed in claim 7, wherein the MIMO algorithm is configured as a linear quadratic regulator of the DC components of current in the primary winding and in the secondary winding.

11. A method comprising:
applying first electrical pulses to a first plurality of switches of a power converter, the power converter comprising: a transformer having a core; a primary winding; a secondary winding electromagnetically coupled to the primary winding via the core; a second plurality of switches for electrically connecting the secondary winding to a secondary link; and the first plurality of switches for electrically connecting the primary winding to a primary link;
applying second electrical pulses to the second plurality of switches, wherein the first electrical pulses and the second electrical pulses are configured for converting power between the primary link and the secondary link;
measuring DC components of current through the primary and secondary windings;
assessing a rate of change of the measured DC components of current in the primary and secondary windings;
generating target time functions of voltage levels of the primary and secondary windings based on the assessed rate of change; and
preventing saturation of the core by adjusting respective pulse widths of the first electrical pulses and the second electrical pulses based on the measured DC components of current and the assessed rate of change of the measured DC components of current in the primary and secondary windings;
wherein the respective adjustments are based on the target time functions; and
wherein the adjustments are set for the pulse widths to approximate the target time functions of the voltage levels, to hold the DC components of current in the primary and secondary windings at near a value of zero.

12. A method as claimed in claim 11, further comprising measuring DC voltage at the primary and secondary windings, wherein the respective pulse widths of the first electrical pulses and the second electrical pulses are adjusted further based on the DC voltage.

13. A method as claimed in claim 11, further comprising low pass filtering the measured DC components of current.

14. A method as claimed in claim 11, further comprising linear quadratic regulation of the DC components of current in the primary winding and in the secondary winding.

* * * * *